US011353008B2

(12) United States Patent
Bazaz

(10) Patent No.: US 11,353,008 B2
(45) Date of Patent: Jun. 7, 2022

(54) NON-NEUTRAL PLASMA ENERGY STORAGE AND RECONVERTER SYSTEM

(71) Applicant: Spar Energy LLC, Montvale, NJ (US)

(72) Inventor: Gaurav Bazaz, Montvale, NJ (US)

(73) Assignee: SPAR ENERGY LLC, Montvale, NJ (US)

( * ) Notice: Subject to any disclaimer, the term of this patent is extended or adjusted under 35 U.S.C. 154(b) by 0 days.

(21) Appl. No.: 17/238,747

(22) Filed: Apr. 23, 2021

(65) Prior Publication Data

US 2021/0332804 A1    Oct. 28, 2021

Related U.S. Application Data

(60) Provisional application No. 63/015,335, filed on Apr. 24, 2020.

(51) Int. Cl.
*F03G 7/00* (2006.01)
*F02M 27/04* (2006.01)
*H05H 1/02* (2006.01)
*H05H 1/24* (2006.01)

(52) U.S. Cl.
CPC .............. *F03G 7/00* (2013.01); *F02M 27/04* (2013.01); *H05H 1/02* (2013.01); *H05H 1/2443* (2021.05)

(58) Field of Classification Search
CPC .......................... H05H 1/2406; H05H 1/2418
See application file for complete search history.

(56) References Cited

U.S. PATENT DOCUMENTS

| 3,878,409 | A | 4/1975 | Gill et al. |
| 3,977,191 | A * | 8/1976 | Britt ................. F01K 3/186 219/121.36 |
| 4,178,759 | A | 12/1979 | Cook |
| 4,428,193 | A | 1/1984 | Papp |
| 7,076,950 | B2 | 7/2006 | Klostermann |
| 9,631,642 | B2 | 4/2017 | Bazaz |
| 10,082,156 | B2 | 9/2018 | Bazaz |

(Continued)

FOREIGN PATENT DOCUMENTS

JP          07224675 A * 8/1995

OTHER PUBLICATIONS

International Application Serial No. PCT/US2016/050262, International Search Report dated Nov. 18, 2016, 2 pgs.

(Continued)

*Primary Examiner* — Laert Dounis
(74) *Attorney, Agent, or Firm* — Hard IP LLC

(57) ABSTRACT

An energy storage system includes a plasma battery and a reconverter to convert energy stored in the plasma battery to electricity. The plasma battery and the reconverter are coupled by a non-neutral plasma duct. The plasma battery includes a plasma battery supercell. The plasma battery supercell includes a plasma battery cell which includes a plasma containment fiber. The plasma containment fiber includes one or more concentric shells to store non-neutral plasma ions for energy storage. The plasma battery may include additional plasma battery supercells, which may be separated by a separator. The plasma battery includes an enclosure to provide electromagnetic shielding. The reconverter includes a power outlet to power an electric load.

20 Claims, 10 Drawing Sheets

(56) References Cited

U.S. PATENT DOCUMENTS

| 2002/0076366 | A1* | 6/2002 | Nelson | B01D 53/32 |
| | | | | 422/186 |
| 2011/0142185 | A1 | 6/2011 | Woodruff | |
| 2015/0020519 | A1 | 1/2015 | Klostermann | |
| 2015/0108765 | A1 | 4/2015 | Choi | |
| 2016/0069356 | A1 | 3/2016 | Bazaz | |
| 2016/0369821 | A1 | 12/2016 | Bazaz | |

OTHER PUBLICATIONS

International Application Serial No. PCT/US2016/050262, Written Opinion dated Nov. 18, 2016, 4 pgs.

U.S. Appl. No. 14/845,241, Notice of Allowance dated Jan. 18, 2017, 9 pgs.

* cited by examiner

US 11,353,008 B2

NON-NEUTRAL PLASMA ENERGY STORAGE AND RECONVERTER SYSTEM

CROSS REFERENCE TO RELATED APPLICATION

This application claims priority to U.S. provisional patent application no. 63/015,335 filed Apr. 24, 2020, the contents of which are hereby incorporated by reference in their entirety.

TECHNICAL FIELD

The present disclosure generally relates to a system for storing energy, and more particularly relates to a system for storing energy using compressed non-neutral plasma.

BACKGROUND

Current models for energy storage suffer from poor energy densities and high cost of operation and manufacture. A variety of designs are available for energy storage devices, such as chemical batteries, but the existing designs typically rely on a method of separation of charges to create an electric potential difference between positively and negatively charged regions.

Some methods store energy chemically while some others use mechanical configurations to store energy. Examples of chemical energy storage include hydrogen fuel as well as naturally occurring energy stores such as fossil fuels like gasoline. Mechanical energy storage is seen in flywheels and compressed air storage, as well as pumped hydropower and other gravitational storage models.

All current models suffer from one or both of two problems. The first problem is economy of manufacture and the second problem is energy density. High energy density options, such as fossil fuels, cannot feasibly be manufactured synthetically in an economical way and are environmentally destructive. On the other hand, systems that can be produced synthetically and manufactured economically generally have very low energy densities, rendering them disadvantageous for a variety of commercial applications.

Therefore, there exists a need for a novel method for storing energy with high energy density and high ease of manufacture. Additionally, an ideal energy storage solution would have a large specific energy, comparable to and preferably higher than fossil fuels, while also being environmentally friendly, efficient, versatile, and scalable.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, an energy storage system for encapsulating a non-neutral plasma for energy storage is provided. The energy storage system includes a plasma battery to store non-neutral plasma. The plasma battery includes a first plasma battery cell. The plasma battery further includes a battery system enclosure. The first plasma battery cell further includes a plasma containment fiber. The plasma containment fiber includes a cladding wall and one or more concentric shells. The plasma containment fiber is configured to store a plurality of plasma ions. The energy storage system also includes one or more non-neutral plasma ducts that are at least temporarily coupled to the plasma battery. The one or more non-neutral plasma ducts are configured to transfer the non-neutral plasma. The energy storage system also includes an energy reconverter that converts energy stored in the plasma battery into electricity. The energy reconverter is at least temporarily coupled to the one or more non-neutral plasma ducts. The energy reconverter includes one or more electrical outlets. The energy reconverter further includes a non-neutral plasma exhaust.

In another aspect of the present disclosure, an energy storage system for storing energy using non-neutral plasma is provided. A plasma battery may be connected to an energy reconverter using one or more non-neutral plasma ducts. The plasma battery may include a plasma battery cell which may include a plasma containment fiber. The plasma fiber may be configured to store plasma ions using one or more concentric shells.

BRIEF DESCRIPTION OF THE DRAWINGS

The present disclosure is illustrated by way of example, and not by way of limitation, in the figures of the accompanying drawings, in which.

DETAILED DESCRIPTION

Figure 1A:
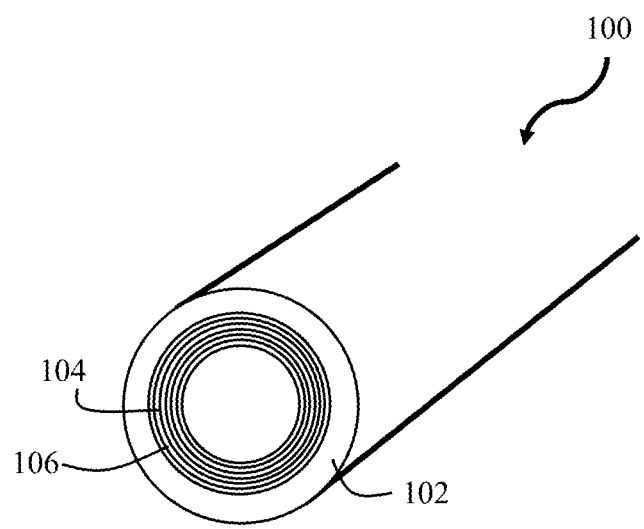
FIG. 1A illustratively depicts a plasma containment fiber, in accordance with an implementation of the disclosure.

Before the present subject matter is described in detail, it is to be understood that this disclosure is not limited to the particular implementations described, as such may vary. It should also be understood that the terminology used herein is to describing particular implementations only, and is not intended to be limiting, since the scope of the present disclosure will be limited only by the appended claims. While this disclosure is susceptible to different implementations in different forms, there is shown in the drawings and will here be described in detail a preferred implementation of the disclosure with the understanding that the present disclosure is to be considered as an exemplification of the principles of the disclosure and is not intended to limit the broad aspect of the disclosure to the implementation illustrated. All features, elements, components, functions, and steps described with respect to any implementation provided herein are intended to be freely combinable and substitutable with those from any other implementation unless otherwise stated. Therefore, it should be understood that what is illustrated is set forth only for the purposes of example and should not be taken as a limitation on the scope of the present disclosure.

In the following description and in the figures, like elements are identified with like reference numerals. The use of "e.g.," "etc.,", "or" and "the like" indicates non-exclusive alternatives without limitation, unless otherwise noted. The use of "having", "comprising", "including" or "includes" means "including, but not limited to," or "includes, but not limited to," unless otherwise noted.

Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one implementation, to A only (optionally including entities other than B); in another implementation, to B only (optionally including entities other than A); in yet another implementation, to both A and B (optionally including other entities). These entities may refer to elements, actions, structures, steps, operations, values, and the like.

Electrical energy is vital to the functioning of modern devices of all sizes. While electricity may be generated through a variety of means, it is commonly necessary to accumulate and store energy such that the electricity generation may be rendered consistent and responsive to demand. As stated above, current models of energy storage, such as chemical, thermal, or mechanical energy storage, suffer from one or both of two problems. The first problem is economy of manufacture and the second problem is energy density. High energy density options, such as fossil fuels, cannot feasibly be manufactured synthetically in an economical way and are environmentally destructive. On the other hand, systems that can be produced synthetically and manufactured economically generally have very low energy densities, rendering them disadvantageous for a variety of commercial applications.

The present disclosure addresses these challenges by providing an energy storage system that may be manufactured economically and with minimal environmental impact while maintaining a high energy density. Specifically, the present disclosure leverages the repulsion between similarly-charged ions in a non-neutral plasma to store energy for electrical generation.

Non-neutral plasma ("NNP"), as used in the present disclosure, include ions of a given species all having the same electric charge polarity ("sign"). As the ions have the same charge sign, they strongly repel each other, especially at short mutual distances. Also, when NNP is placed in a material confinement chamber, the NNP ions force each other to the walls. It is theoretically predicted that the ions are unlikely to occupy the inner volume but rather that the majority of the ions will accumulate at the walls.

The present disclosure initiates with the creation of two columns of NNP; one with positive net charge and one with negative net charge. The two columns are physically separated. Each column is separately compressed in a compression chamber. The compression involves step of compressing the NNP in a compression chamber using an external force. The force could be mechanical or electromagnetic. This step is then followed by the step of storing the NNP received from the compression chamber in a containment chamber. Various methods for creating NNP may be used. The step of compressing the NNP results in energy being drawn from an external source and stored within the NNP in the form of mutual electrostatic repulsion between the ions of the NNP.

The method further includes the steps of transferring a portion of the NNP into the energy reconverter at high pressure and expanding the NNP inside the energy reconverter to regenerate usable energy. As the NNP expands, it drives a movable body and converts the stored energy into mechanical work. When the NNP is compressed, work done by the external force is stored in the compressed NNP as the repulsive interaction of the ions of the NNP. When the NNP is allowed to expand, the ions of the NNP move away from each other under the influence of their mutual electric field, thereby converting the stored energy into mechanical work. This mechanical work can be used to drive a generator to produce electricity.

Various aspects of the above referenced system are described in detail herein by way of examples, rather than by way of limitation.

FIG. 1A illustratively depicts a plasma containment fiber 100. The plasma containment fiber 100 includes a cladding wall 102, one or more concentric shells 104, and one or more plasma containment spaces 106. The plasma containment fiber 100 may include a cylindrical tube.

In an implementation, the plasma containment fiber 100 has a diameter of less than 1 millimeter. In another implementation, the plasma containment fiber 100 has a diameter of between 0.05 millimeters and 0.40 millimeters. In yet other implementations, the diameter may be of any size. The plasma containment fiber 100 includes a high thickness cladding wall 102 with concentric shells 104 to create plasma containment spaces 106 between them. The plasma containment spaces 106 between concentric shells 104 may be evacuated to high levels of vacuum. In an implementation, the plasma containment spaces 106 are evacuated to approximately $10^{16}$ particles per cubic meter before the placement of NNP ions inside these spaces but may be evacuated to be different level of particles per cubic meter.

The cladding wall 102 is located on the exterior surface of the plasma containment fiber 100 and may provide protective cover for the concentric shells 104. The plasma containment fiber 100, the cladding wall 102 and the concentric shells 104 may be fabricated with dielectric materials with a high dielectric breakdown limit. While a circular cross-sectional shape for the fiber and concentric shells might be preferred from a manufacturing consideration, other shapes are possible as well, including square or rectangular.

Figure 1B:
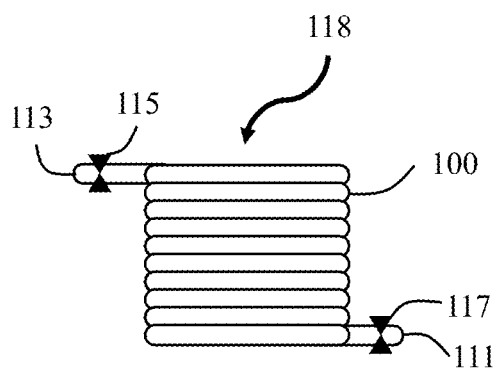
FIG. 1B illustratively depicts a side view of a plasma battery cell, in accordance with an implementation of the disclosure.

FIG. 1B illustratively depicts a side view 108 of a plasma battery cell 118. The plasma battery cell 118 includes a plasma containment fiber 100, a first cell endpoint 111, a second cell endpoint 113, a first control gate 117, and a second control gate 115. In an implementation, at least one of the first cell endpoint 111 or the second cell endpoint 113 are open to allow the inflow and outflow of NNP into and out of the plasma battery cell.

The plasma battery cell 118 may be formed by wrapping the plasma containment fiber 100 in a circular pattern to form a coil-shaped structure. In an implementation, the plasma containment fiber 100 is configured to be wrapped in a circular pattern to form a coil-like form factor.

The first control gate 117 is affixed near the first cell endpoint 111 and the second control gate 115 is affixed near the second cell endpoint 113. In an implementation, the first control gate and the second control gate control the flow of NNP in and out of the plasma battery cell 118.

In an implementation, multiple plasma battery cells 118 may be at least temporarily joined together to form a single plasma battery (not shown).

Figure 1C:
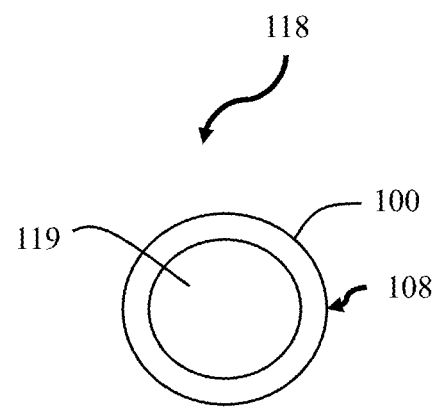
FIG. 1C illustratively depicts a top view of a plasma battery cell, in accordance with an implementation of the disclosure.

FIG. 1C illustratively depicts a top view 120 of a plasma battery cell 118. The plasma battery cell 118 includes a plasma containment fiber 100 and an empty space 119. In an implementation, the plasma battery cell 118 includes a coiled plasma containment fiber 100 forming a circular pattern with an empty space 119 adjacent to the plasma containment fiber 100, interior to the circular wraparound of the plasma containment fiber 100. While FIG. 1C illustrates one implementation of a plasma battery cell with a single wraparound layer around a central axis, other implementations with multiple wraparound layers are also possible, with a smaller or larger empty space 119.

Figure 2A:
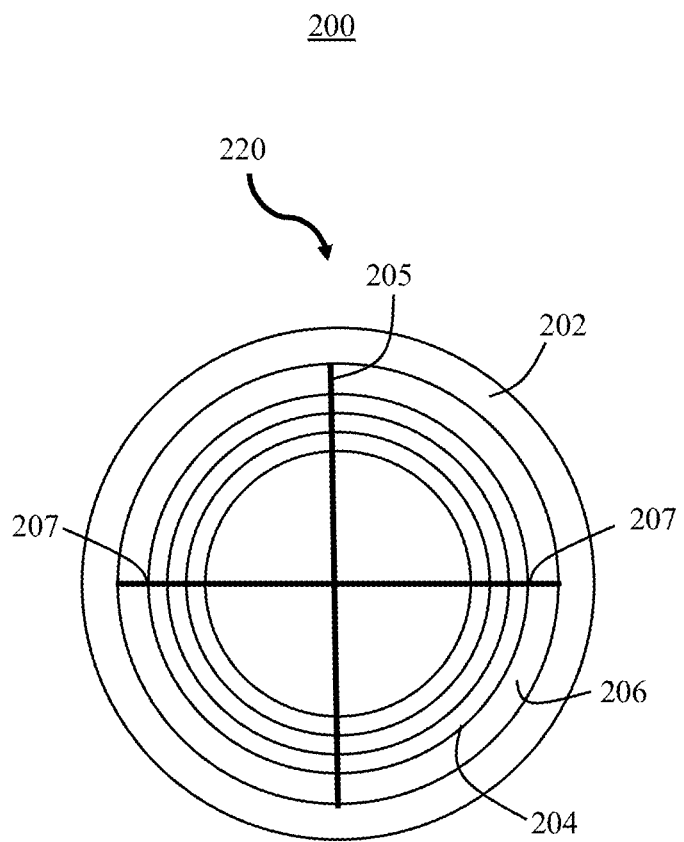
FIG. 2A illustratively depicts a front cross-sectional view of a plasma containment fiber, in accordance with an implementation of the disclosure.

FIG. 2A illustratively depicts a front cross-sectional view 200 of a plasma containment fiber 220. The plasma containment fiber 220 includes a cladding wall 202, one or more concentric shells 204, one or more cross-rib structures 205, a plasma containment space 206, and one or more support points 207. The plasma containment fiber 220 may be the same as the plasma containment fiber 100 as described in FIG. 1A above. The cross-rib structures 205 may provide structural support to the concentric shells 204. In an implementation, the cross-rib structures 205 intersect and fuse with the concentric shells 204 at support points 207. In an implementation, the one or more concentric shells 204 have a thickness of between 0.01 millimeter and 0.3 millimeter. In a further implementation, the one or more concentric shells are separated from each other by a distance of between 0.005 millimeters and 0.06 millimeters. In yet other implementations, the separation may include other distances.

The plasma containment fiber 220, the cladding wall 202, the concentric shells 204 and the cross-rib structures 205 may be constructed from dielectric materials with a very high dielectric breakdown limit such that they are capable of sustaining very high electric fields from high spatial density of ions before suffering electric breakdown. In an implementation, the dielectric material is one of lead, silica, graphite, diamond-like carbon or synthetic diamond.

The plasma containment fiber 220 may be manufactured using methods similar to those used to manufacture optical fibers. In an implementation, the plasma containment fiber 220 is manufactured using one of Chemical Vapor Deposition or Vapor Phase Axial Deposition. Methods used to manufacture Hollow Core Optical Fibers are especially suitable for the task of manufacturing the plasma containment fiber 220.

Figure 2B:
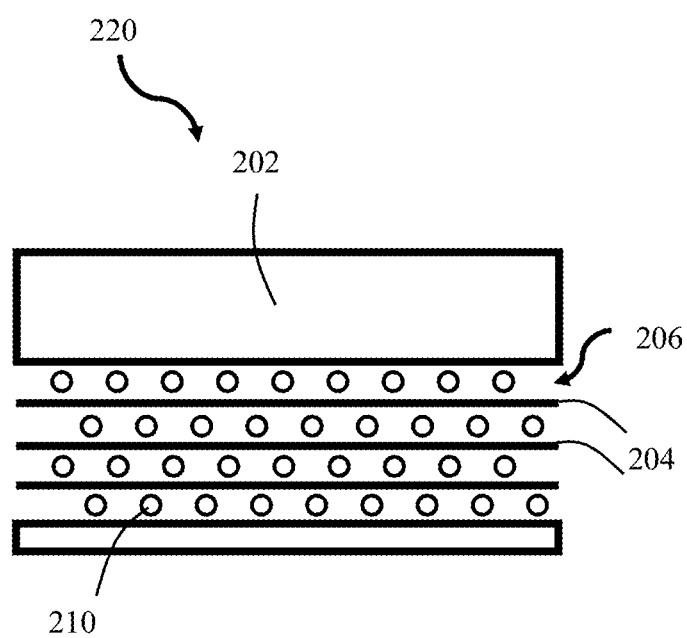
FIG. 2B illustratively depicts a side cross-sectional view of a plasma containment fiber, in accordance with an implementation of the disclosure.

FIG. 2B illustratively depicts a side cross-sectional view 208 of a plasma containment fiber 220. The plasma containment fiber 220 includes a cladding wall 202, one or more concentric shells 204, a plasma containment space 206, and multiple plasma ions 210. The plasma containment fiber 220 may be the same as the plasma containment fiber 100 and/or the plasma containment fiber 220 as described in FIGS. 1A and 2A above, respectively. In an implementation, a first concentric shell 204 and a second concentric shell 204 define an evacuated free space between the first concentric shell 204 and the second concentric shell 204. In a further implementation, the evacuated free space is a plasma containment space 206. The plasma ions 210 may be introduced into the plasma containment spaces 206 by pumping the plasma ions 210 under pressure into the plasma containment fiber 220. In an implementation, the plasma containment space 206 is configured to receive and at least temporarily store the plasma ions 210. As the plasma ions 210 are pumped in, they are expected to occupy the plasma containment spaces 206 and naturally try to place themselves as far apart from other plasma ions 210 as possible due to electrostatic repulsion.

In an implementation, the plasma containment spaces 206 are extremely thin, with a vertical height (space between adjacent concentric shells) on the order of few micrometers or less. In other implementations, the plasma containment spaces may be other sizes. The plasma ions 210 also are expected to organize to accumulate near the outer wall of each plasma containment space 206 due to the influence of mutual electrostatic fields. The plasma ions 210 may thereby be constricted within the plasma containment spaces 206 by virtue of the impermeability of the concentric shells 204 and cladding wall 202. The term plasma ions 210, as used herein, refers to non-neutral plasma ions of like charge polarity (sign).

The plasma containment spaces 206 may also contain particles that are not plasma ions 210, and therefore not part of the NNP working fluid, such as neutral atoms and other ions, but such particles are disregarded here for simplicity. Since the plasma containment spaces 206 may be evacuated to extremely low pressures (very high vacuum) before entry of NNP working fluid ions, the plasma ions 210, the non-NNP particles are expected to be present in relatively small numbers and are mostly non-interacting with the NNP ions in steady state. Also, since plasma ions 210 are pumped into all plasma confinement spaces 206, across different concentric shells 204, it is expected that most or all plasma containment spaces 206 will be populated with plasma ions 210. By virtue of this design, plasma ions 210 may be forced into the plasma confinement spaces 206 of the plasma containment fiber 220.

In an implementation, if there were only a single bore fiber, all plasma ions 210 would occupy the spaces along the walls and the inner volume would be devoid of plasma ions 210. This would result in low ion density and therefore low energy density. By having multiple concentric shells 204 inside the single bore of the plasma containment fiber 220, plasma ions 210 may be forced into the inner volume of the plasma containment fiber 220 and thereby place multiple layers of plasma ions 210 inside the plasma containment fiber 220 and therefore achieve much higher ion density and therefore higher energy density.

The number of plasma ions 210 placed inside the system may be optimized in order to satisfy two competing requirements. On the one side, ion density (ions per unit volume) is to be maintained below the threshold at which the ion density and resulting electric field is so high, that it causes the concentric shells 104, cladding wall 102 and the plasma containment fiber 100 to start breaking down due to the influence of the electric field from the ions. On the other hand, higher ion density results in higher energy density, therefore ion density should be pushed as high as possible to maximize the energy density of the system.

The total usable energy stored within a plasma battery cell may be estimated using the following equation:

$$E = k \cdot \frac{q^2}{r} \cdot \frac{n(n-1)}{2}$$

where:
E=usable energy in the plasma battery cell (in joules)
n=number of NNP ions in the plasma battery cell
q=charge per ion (in Coulombs)
r=average inter-ion distance (in meters)
k=Coulomb's constant=$8.988 \times 10^9$ N·m$^2$/C$^2$ The plasma containment fiber 220 with concentric shells 204 and plasma containment spaces 206 form a design structure which solves multiple problems associated with non-electromagnetic confinement of NNPs. First, the fiber structure with concentric shells enables a very high ion density by volume within a structure of a given macroscopic volume by enabling a mechanism to force ions into the interior volume, in spite of their tendency to migrate to the walls of a containment structure. Second, the fiber structure maximizes the surface area of the containment walls per unit charge thereby minimizing the impinging electric field per unit area of the containment structure, which in turn enables a much higher ion density than would be otherwise possible given the limits imposed by dielectric breakdown caused by strong electric fields.

Figure 3A:
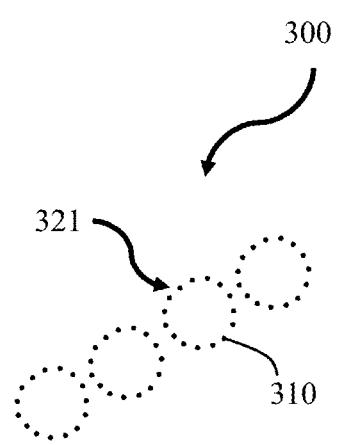
FIG. 3A illustratively depicts a model of multiple plasma ion rings as expected to form inside a plasma containment fiber, in accordance with an implementation of the disclosure.

FIG. 3A illustratively depicts a model of multiple plasma ion rings 300 as expected to form inside a plasma containment fiber (not shown). The plasma ion rings 321 include plasma ions 310.

The plasma ions 310 are expected to form plasma ion rings 321 within each concentric shell (not shown) and each plasma ion ring 321 is separated from the next ring by a certain distance, the interparticle distance (IPD). This distance between adjacent plasma ion rings 321 may be approximately the same as the distance between adjacent plasma ions 310 within a plasma ion ring 321.

Also, the plasma ion rings 321 may form at an angle to the plane perpendicular to the axis of the plasma containment fiber (not shown) in order to maximize the mutual distance between any pair of plasma ions 310. Under the influence of the mutual electric field, the plasma ions 310 may self-organize in order to minimize the system energy. By having a large number of plasma ions 310 in close proximity, a large amount of energy may be stored within this system. The ion organization shown here is a simplification and ignores the thermodynamics of the plasma ions 310, therefore the drawings show the equilibrium average relative position of ions in steady state, not the actual ion positions. In an implementation, the plasma containment fiber (not shown) is configured to encapsulate the non-neutral plasma such that the equilibrium average mutual distance between the plasma ions is between 0.01 micrometers and 1 micrometer. Actual plasma ions 310 within the system may be constantly in motion and their relative positions may thereby also be in flux. Other distances may exist.

Figure 3B:
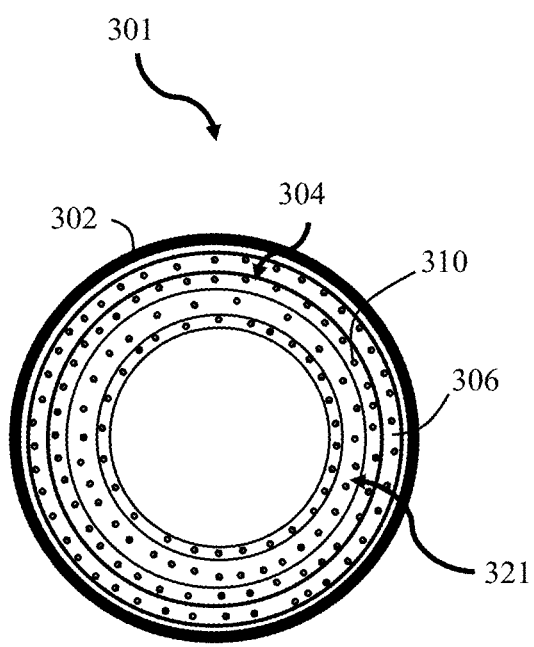
FIG. 3B illustratively depicts a plasma containment fiber containing plasma ion rings, in accordance with an implementation of the disclosure.

FIG. 3B illustratively depicts a plasma containment fiber 301 containing plasma ion rings 321. The plasma containment fiber includes a cladding wall 302, one or more concentric shells 304, a plasma containment space 306, one or more plasma ion rings 321, and multiple plasma ions 310. In an implementation, the plasma ions 310 occupy spaces almost identically apart from each other within the plasma containment spaces 306. The concentric shells 304 may separate the plasma ions 310 from the next plasma ion ring 321. The cladding wall 302 forms the exterior wall of the plasma containment fiber 301. Again, as in FIG. 3A, this is a simplified view showing the equilibrium average relative position of plasma ions 310 in steady state, not the actual positions. Actual plasma ions 310 within the system are expected to be in constant motion.

Figure 4A:
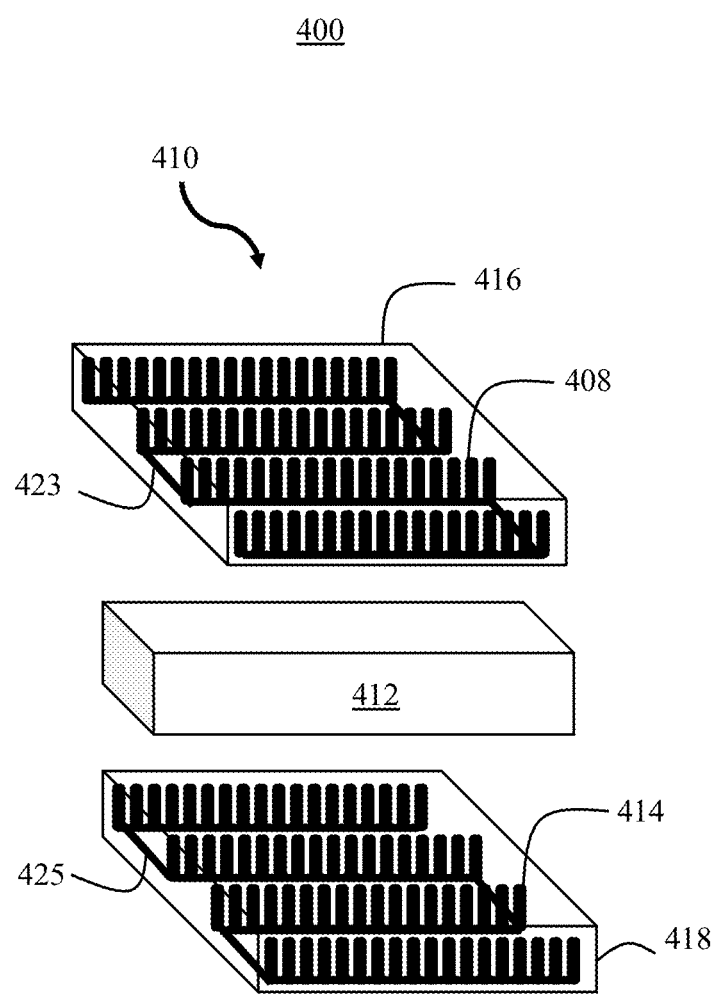
FIG. 4A illustratively depicts an exploded interior view of a plasma battery, in accordance with an implementation of the disclosure.

FIG. 4A illustratively depicts an exploded interior view 400 of a plasma battery 410. The plasma battery 410 includes a first plasma battery supercell 416, a second plasma battery supercell 418, and a separator 412. The first plasma battery supercell 416 includes multiple plasma battery cells 408 and multiple NNP transport connectors 423. The second plasma battery supercell 418 includes multiple plasma battery cells 414 and multiple NNP transport connectors 425. Plasma battery supercells are shown here in wireframe form to make their interior contents visible.

In an implementation, multiple plasma battery cells 408 may be at least temporarily coupled to each other to form the first plasma battery supercell 416. Likewise, the multiple plasma battery cells 414 may be at least temporarily coupled to each other to form the second plasma battery supercell 418. In a further implementation, the multiple plasma battery cells 414 may have the same electric charge polarity in relation to each other. Likewise, the multiple plasma battery cells 414 may have the same electric charge polarity in relation to each other.

The plasma battery cells 408 of the first plasma battery supercell 416 may contain NNP plasma ions (not shown) of opposite electric charge polarity in relation to the NNP plasma ions contained in the plasma battery cells 414 of the second plasma battery supercell 418 (one positive and other negative). In an implementation, the first plasma battery supercell 416 has a substantially equal magnitude of charge in relation to the second plasma battery supercell 418 so that the total net charge of the overall energy storage system across the plasma battery 410 is minimized (e.g., near zero). Therefore, if plasma battery cells 408 in the first plasma battery supercell 416 hold plasma ions of positive charge, then plasma battery cells 414 in the second plasma battery supercell 418 may hold plasma ions of negative charge.

The first plasma battery supercell 416 and the second plasma battery supercell 418 may be separated by a separator 412 which provides safe passageway for the electric field lines between the first plasma battery supercell 416 and the second plasma battery supercell 418. The first plasma battery supercell 416 may be a container which includes multiple plasma battery cells 408, and the second plasma battery supercell 418 may be a container which includes multiple plasma battery cells 414 with all plasma battery cells within a plasma battery supercell having a mutual connection through NNP transport connector 423 and NNP transport connector 425 which allows transport of ions from one location to another. The separator 412 may be constructed from dielectric materials which can withstand very high electric fields without breaking down. In an alternative implementation, the plasma battery may have no separator 412, and may include instead only the plasma battery supercell 418 and the plasma battery supercell 416. In another implementation, multiple plasma battery supercells form each charge polarity, for instance 3 positive charge and 3 negative charge supercells may be combined to form a plasma battery, with or without separators between each pair of supercells. In an implementation, the separator may be constructed from a dielectric material such as lead, silica, or graphite.

Figure 4B:
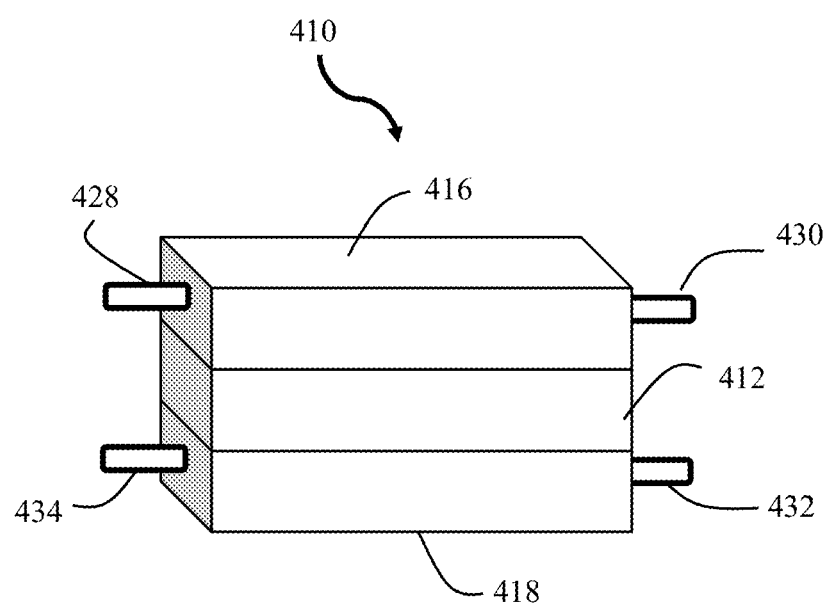
FIG. 4B illustratively depicts an exterior view of a plasma battery, in accordance with an implementation of the disclosure.

FIG. 4B illustratively depicts an exterior view 402 of a plasma battery 410. The plasma battery 410 includes a first plasma battery supercell 416, a second plasma battery supercell 418, and a separator 412. The first plasma battery supercell 416 includes a feed-in line 428 and a feed-out line 430. The second plasma battery supercell 418 includes a feed-in line 434 and a feed-out line 432. The feed-in line 428 allows pumping of NNP into the plasma battery cells (not shown) of the first plasma battery supercell 416. The feed-out line 430 allows the pressurized NNP to be drawn out of the plasma battery cells of the first plasma battery supercell 416 into an energy reconverter (not shown). The feed-in line 434 and the feed-out line 432 perform identical functions as the feed-in line 428 and feed-out line 430, respectively, for the second plasma battery supercell 418.

The feed-in and feed-out lines may also have control valves (not shown) that control the flow of NNP through these lines. The control valves may be simple barriers that can be controlled to allow or disallow the flow of ions across the control valves in the NNP transport lines.

Figure 5:
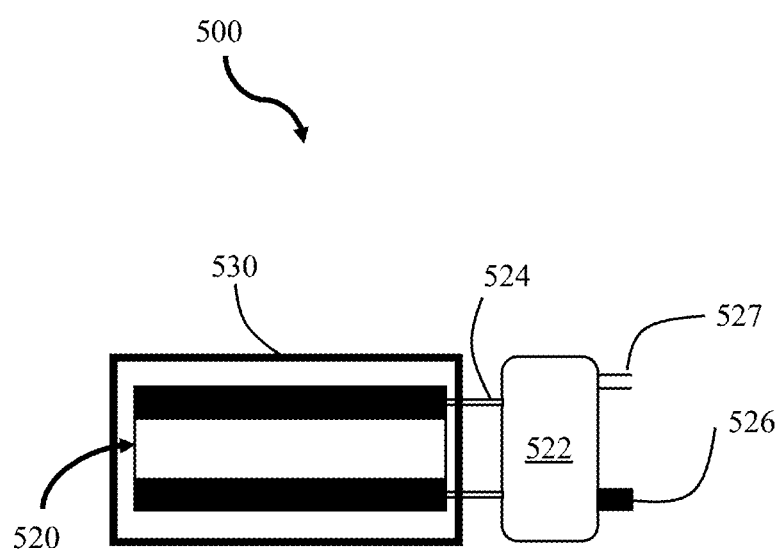
FIG. 5 illustratively depicts a system schematic of an energy storage system, in accordance with an implementation of the disclosure.

FIG. 5 illustratively depicts a system schematic of an energy storage system 500. The energy storage system 500 includes a plasma battery 520, an energy reconverter 522, one or more NNP ducts 524, an NNP exhaust 526, one or more electrical outlets 527, and a plasma battery system enclosure 530. The plasma battery 520 may be the same as the plasma battery 410 as described in FIGS. 4A and 4B above. The plasma battery 520 may include a plasma battery cell (not shown) as described in FIG. 1B above. In an implementation, the energy reconverter 522 is at least temporarily coupled to the NNP ducts 524 and is configured to convert energy stored in the plasma battery into electricity as will be described below.

NNP plasma is drawn from the plasma battery 520 into the energy reconverter 522 through the NNP ducts 524. In an implementation, the first plasma supercell (not shown) and the second plasma supercell (not shown), described in FIGS. 4A and 4B above, are configured to at least temporarily couple to the NNP ducts 524. Thus, the NNP ducts 524 are configured to transfer the non-neutral plasma. In an implementation, NNP plasma is drawn equally from each plasma battery supercell so that net charge in the plasma battery 520 is maintained close to zero at all times. In an implementation, only NNP of one single electric charge polarity, that is from one of the two plasma battery supercells, is processed by the energy reconverter 522 at a time.

Otherwise, the energy reconverter 522 processes both charge types in such a way that they are unlikely to interact with each other until they exit the energy reconverter 522. De-energized NNP may be allowed to exit the energy reconverter 522 through the NNP exhaust 526. Additionally, electric power generated by the energy reconverter 522 is supplied to an electrical load (not shown) through electrical outlets 527. In an implementation, the energy reconverter 522 converts the stored energy of the pressurized NNP into electrical power which may be used by a load to do useful work. Energy that is stored in the NNP ions in the form of mutual electrostatic repulsion may be released in the energy reconverter 522 through a process which enables the plasma ions (not shown) to expand their mutual distance thereby reducing their mutual electrostatic repulsion and in process doing mechanical work which enables generation of electric power.

In one implementation, the energy reconverter includes an expansion chamber, a piston, a drive shaft and a cylinder. An inflow valve injects the NNP received from the plasma battery via the ducts, into a loading chamber and from the loading chamber into the energy reconverter. Once the NNP is injected into the cylinder of the energy reconverter, the inflow valve of the energy reconverter is sealed shut.

The NNP expands in the expansion chamber of the cylinder due to its internal pressure. A piston at the base of the cylinder is movable and thus allows the NNP to expand. The NNP drives the piston outwards due its internal pressure caused by the mutual repulsion of like-charged ions and releases its pressure energy which is used to do work. The piston drives a drive shaft, which in turn, provides the mechanical work such as driving a generator to produce electricity. Thus, the expansion of the NNP is converted into mechanical work and thereafter electric energy. Further, when the piston has been moved to its farthest point then the NNP is fully expanded.

Once the piston reaches its farthest position in the cylinder, an exhaust valve of the energy reconverter opens. Thereafter, the piston moves inwards under its own momentum to drive the expanded NNP out of the expansion chamber into an exhaust channel of the energy reconverter through the exhaust valve. When the piston moves to the peak position within the cylinder, the position closest to the inlets and outlets, the expanded NNP is fully ejected from the cylinder through the exhaust valve into an exhaust channel.

The exhaust valve of the energy reconverter closes once the expanded NNP is fully ejected from the cylinder. Now, the cycle explained above is repeated, with the inflow valve opening again and allowing a pre-determined amount of NNP into the cylinder.

The energy storage system 500 may have various additional components for commercial deployments. This includes safety features such that NNP is safely discharged in case of containment failure. In an implementation, the space between plasma battery cells is filled with lead or graphite. When there is any leakage in a plasma battery cell, the leaking ions are absorbed into the lead or graphite bulk.

Additionally, safety features to prevent sudden shocks and external electromagnetic fields from impacting or disturbing the ions within the plasma battery 520 are placed. In one implementation, the plasma battery system enclosure 530 of the plasma battery 520 has two or more layers (not shown), with the space between each layer including dampers and shock absorbers (not shown), to absorb mechanical vibrations and shocks before they reach the containment cells. The shock absorbers could be spring or hydraulic type and mounted such that they form the primary connection between the plasma battery 520 and the external structure on which the plasma battery is mounted, so that any mechanical vibrations or shocks transmitted from an external source are transmitted through the shock absorbers and weakened before reaching the plasma battery. In an implementation, the battery system enclosure may include a system such as a Faraday cage to shield the plasma battery from strong external electromagnetic fields. When an external electromagnetic field is present in the region of the plasma battery, the metal cage structure will shield the plasma battery by cancelling the external field inside the cage by forming a counter charge layer within the surface of the metal cage. Additionally, the form factor can be customized to specific use cases and customer requirements.

Various control electronics and software may be added to monitor charge levels, energy levels, control discharging, control valve operations, control other electromechanical components and gates. In one implementation, the control software ensures that all cells are discharged uniformly and overall net charge of the system across the positive and negative plasma battery supercells is maintained near zero.

The plasma ions used in the energy storage system may be derived from many different elements, including: Hydrogen, Lithium, Sodium, Neon, Helium, Argon, and/or Xenon.

While the implementations are susceptible to various modifications and alternative forms, specific examples thereof have been shown in the drawings and are herein described in detail. It should be understood, however, that these implementations are not to be limited to the particular form disclosed, but to the contrary, these implementations are to cover all modifications, equivalents, and alternatives falling within the spirit of the disclosure. Furthermore, any features, functions, steps, or elements of the implementations may be recited in or added to the claims, as well as negative limitations that define the inventive scope of the claims by features, functions, steps, or elements that are not within that scope.

What is claimed is:

1. An energy storage system for encapsulating a non-neutral plasma for energy storage, comprising:
    a plasma battery to store non-neutral plasma, wherein the plasma battery comprises a first plasma battery cell, wherein the plasma battery further comprises a battery system enclosure, wherein the first plasma battery cell further comprises a plasma containment fiber, wherein the plasma containment fiber comprises a cladding wall and one or more concentric shells, and wherein the plasma containment fiber is configured to store a plurality of plasma ions;
    one or more non-neutral plasma ducts at least temporarily coupled to the plasma battery, wherein the one or more non-neutral plasma ducts are configured to transfer the non-neutral plasma; and
    an energy reconverter to convert energy stored in the plasma battery into electricity, wherein the energy reconverter is at least temporarily coupled to the one or more non-neutral plasma ducts, wherein the energy reconverter comprises one or more electrical outlets, and wherein the energy reconverter further comprises a non-neutral plasma exhaust.

2. The energy storage system of claim 1, wherein the plasma containment fiber comprises a cross-rib structure for structural support.

3. The energy storage system of claim 1, wherein the plasma containment fiber is configured to be wrapped in a circular pattern of layers to form a coil-like form factor.

4. The energy storage system of claim 1, wherein the plasma containment fiber comprises a diameter of between 0.05 millimeters to 0.40 millimeters.

5. The energy storage system of claim 4, wherein the plasma containment fiber comprises a concentric shell comprising a thickness between 0.01 millimeter and 0.3 millimeter.

6. The energy storage system of claim 1, wherein the one or more concentric shells are separated from each other by a distance of between 0.005 millimeters and 0.06 millimeters.

7. The energy storage system of claim 1, wherein the plasma containment fiber is configured to encapsulate the non-neutral plasma such that an equilibrium average mutual distance between the plurality of plasma ions is between 0.01 micrometers and 1 micrometer.

8. The energy storage system of claim 3, wherein the plasma battery comprises one or more additional plasma battery cells.

9. The energy storage system of claim 8, wherein the first plasma battery cell and the one or more additional plasma battery cells have a same electric charge polarity.

10. The energy storage system of claim 9, wherein the first plasma battery cell is configured to at least temporarily couple to the one or more additional plasma battery cells to form a first plasma battery supercell.

11. The energy storage system of claim 10, wherein the first plasma battery supercell further comprises a dielectric material.

12. The energy storage system of claim 11, wherein the energy storage system further comprises a second plasma battery supercell.

13. The energy storage system of claim 12, wherein the second plasma battery supercell has an opposite electric charge polarity in relation to the first plasma battery supercell.

14. The energy storage system of claim 13, wherein the first plasma battery supercell has a substantially equal magnitude of charge in relation to the second plasma battery supercell, such that a total net charge across the plasma battery is minimized.

15. The energy storage system of claim 12, wherein the first plasma battery supercell and the second plasma battery supercell are configured to at least temporarily couple to the one or more non-neutral plasma ducts.

16. The energy storage system of claim 12, wherein the first plasma battery supercell and the second plasma battery supercell are separated by a separator, wherein the separator comprises a dielectric material.

17. The energy storage system of claim 1, wherein an evacuated free space is located in between the one or more concentric shells, wherein the evacuated free space is a plasma containment space, and wherein the plasma containment space is configured to receive and at least temporarily store the plurality of plasma ions.

18. The energy storage system of claim 3, wherein the battery system enclosure comprises two or more layers.

19. The energy storage system of claim 18, wherein the battery system enclosure further comprises at least one of a damper or a shock absorber.

20. The energy storage system of claim 19, wherein the battery system enclosure comprises a cage, and wherein the cage is configured to shield the plasma battery from external electromagnetic fields.

* * * * *